350-96.25
5/15/79    OR    4,154,501    SR

United States Patent [19]
Fischer

[11]    4,154,501
[45]    May 15, 1979

[54]  INTERLEAVING DEVICE

[75]  Inventor:  James R. Fischer, Greenbelt, Md.

[73]  Assignee:  The United States of America as represented by the Administrator of the National Aeronautics and Space Administration, Washington, D.C.

[21]  Appl. No.: 830,272

[22]  Filed:  Sep. 2, 1977

Related U.S. Application Data

[63]  Continuation-in-part of Ser. No. 678,813, Apr. 21, 1976, abandoned.

[51]  Int. Cl.$^2$ ............................................... G02B 5/17
[52]  U.S. Cl. .................................. 350/96.25; 365/120
[58]  Field of Search ..................... 350/96.10, 96.25; 365/120, 127

[56]   References Cited
       U.S. PATENT DOCUMENTS

| | | | |
|---|---|---|---|
| 3,192,843 | 7/1965 | Kapany et al. | 350/96.10 |
| 3,254,557 | 6/1966 | Brake et al. | 350/96.10 |
| 3,473,872 | 10/1969 | Okamura | 350/96.25 |
| 3,996,455 | 12/1976 | Schaefer et al. | 350/96.25 |

OTHER PUBLICATIONS

Schaefer et al., "TSE Computers", Goddard Space Flight Center, Pub. No. X-943-75-14, Jan. 1975.

*Primary Examiner*—John K. Corbin
*Assistant Examiner*—Stewart Levy
*Attorney, Agent, or Firm*—Robert D. Marchant; John R. Manning; John O. Tresansky

[57]   ABSTRACT

An interleaving device for processing energy signals between various logic devices having a first plurality of spaced energy carrying layer materials. Each of the first layer materials has a plurality of juxtaposed conduits for passing energy signals therethrough. Each of the conduits has a longitudinal axis substantially parallel to a diagonal of each of the first layers. A second plurality of energy carrying materials is arranged between adjacent ones of the spaced first layer materials. Each of the second layer materials has a plurality of juxtaposed conduits for passing the energy signals therethrough. Each of the conduits in the second layer has a longitudinal axis substantially parallel to a diagonal of each of the second layer materials and substantially perpendicular to the axes of the conduits of the first layer materials.

28 Claims, 25 Drawing Figures

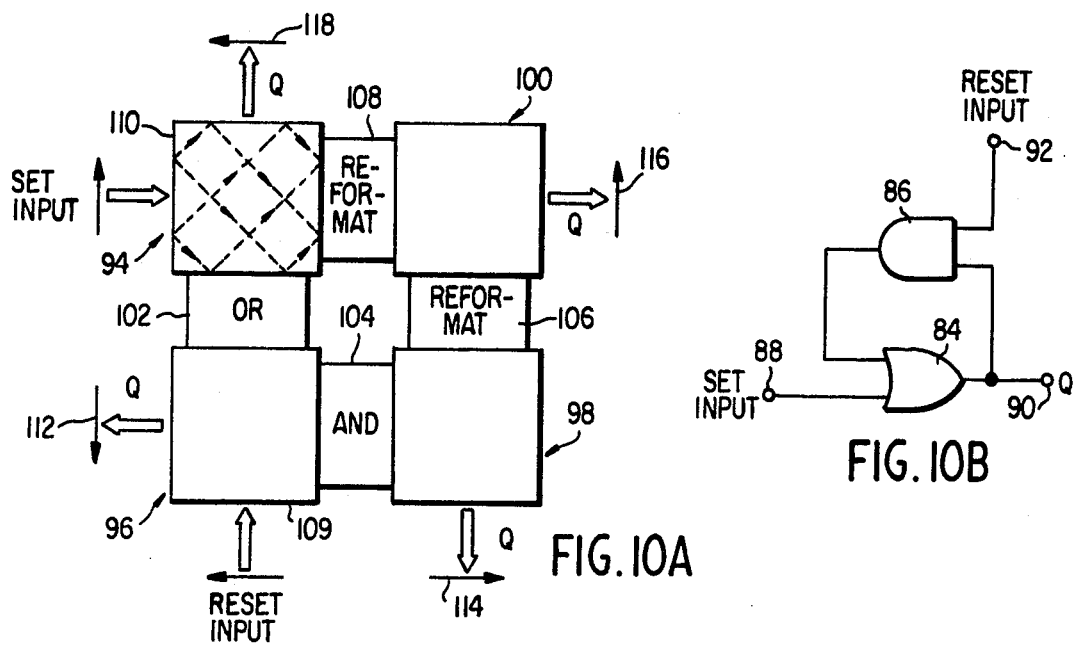
FIG.10A
FIG.10B
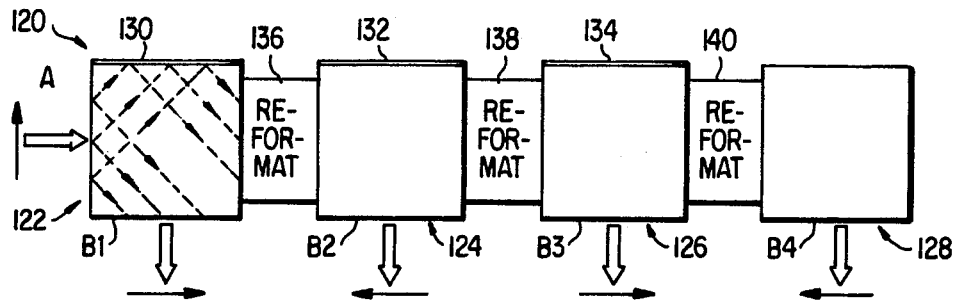
FIG.11
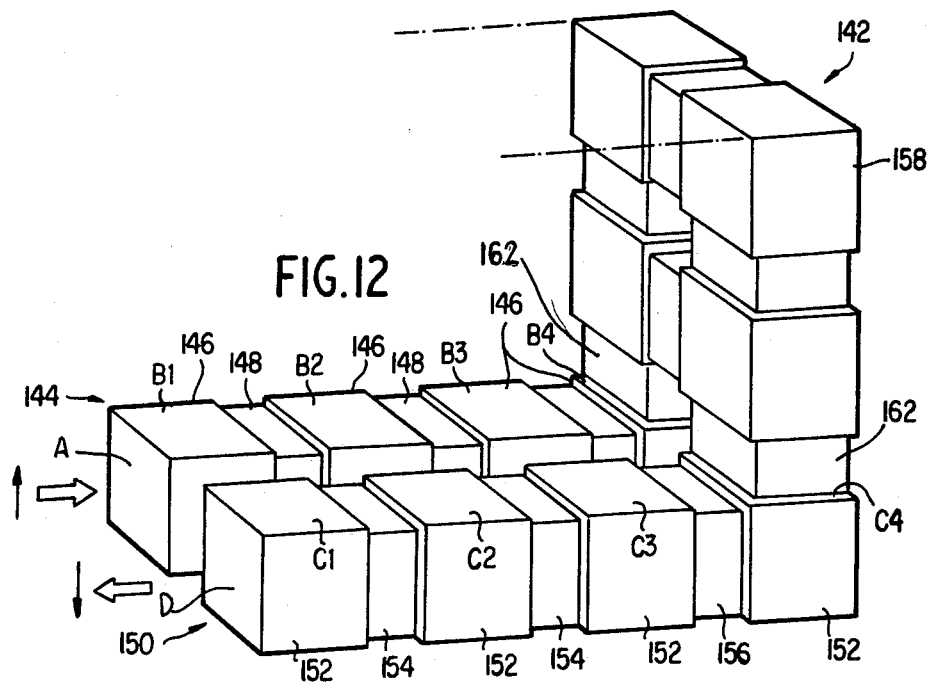
FIG.12

INTERLEAVING DEVICE

ORIGIN OF THE INVENTION

The invention described herein was made by an employee of the United States Government and may be manufactured and used by or for the Government for Governmental purposes without the payment of any royalties thereon or therefor.

CROSS REFERENCE TO RELATED APPLICATIONS

This application is a continuation-in-part of an application of James R. Fischer, Ser. No. 678,813, filed Apr. 21, 1976 now abandoned, entitled "A CUBIC INTERLEAVER" and assigned to the United States Government.

BACKGROUND OF THE INVENTION

This invention relates generally to interleaving devices and more particularly to interleaving devices for processing energy signals to various type logic devices.

Interleaving devices, generally known as signal duplicating and combining devices, are used for processing energy signals, and particularly optical images. These devices have been used whenever signals are to be combined or duplicated such as is necessary in recording heads, in connecting various logic devices in computers and in forming various computer components.

One prior art device utilizes layers of optical fibers which are fastened together by cement to form optical ribbons. These ribbons typically contain 128 optical fibers. The optical ribbons are cut at an angle with respect to the axis defined by the linearly arranged optical fibers. The preferred angle cut is about 12 degrees with respect to the axis of the fibers. The various cut ribbons are alternately stacked as odd and even layers where the odd layers are even layers flipped over. The result is a solid structure in the shape of a trapezoid. When two separate images are inputted to the wide end the two images will emerge as a combined image at the narrow end. Conversely, when a single image is inputted to the narrow end two separate images will emerge from the wide end.

One disadvantage of the above prior art device is that when two separate images are inputted at the wide end a large portion of the transmitted images are lost out at the sloped or side faces of the trapezoidal structure. Thus, the combined image will not be as bright as the intensity of the two images when added together.

Another disadvantage is that when one image is inputted at the narrow end only a portion of the optical fibers located at the wide end will carry the image. Thus, the overall efficiency of the interleaver is decreased.

A further disadvantage is that the trapezoidal configuration makes combining interleavers with other interleavers or other image processing devices difficult thus necessitating costly and bulky interconnecting devices.

In other similar prior art devices the individual layers are formed of a single piece material, such as glass or plastic, and are formed as trapezoidal structures. These structures are alternately layered to form a large trapezoidal structure or layered to form a block having a V-shaped cut on one surface. The energy inputted to the various faces are internally reflected by the sides of the individual side faces of each trapezoidal structure so they eventually emerge from another face area.

One limitation of the above prior art device is that because a number of individual energy carrying conduits are not used in each layer structure a large energy loss occurs within the layers. Another shortcoming is the expense of making such interleavers because the sides must be accurately formed for total internal reflection. A further disadvantage is the difficulty of connecting several interleavers with other energy processing devices when configured in this manner.

SUMMARY OF THE INVENTION

Accordingly, these and other disadvantages are overcome by providing an interleaving device having a first plurality of spaced energy carrying layers. Each first layer has a plurality of juxtaposed conduits for passing energy signals therethrough. Each conduit has a longitudinal axis approximately parallel to a diagonal of each first layer. A second plurality of energy carrying layers are arranged between adjacent ones of the first layers. Each of the second layers has a plurality of juxtaposed conduits for passing the energy signals therethrough. Each of the conduits in the second layers has a longitudinal axis approximately parallel to a diagonal of the second layers and substantially perpendicular to the axis of the conduits of the first layers.

Accordingly, one object of the present invention is to provide a new and improved interleaving structure.

Another object of this invention is to provide an interleaving structure that passes substantially all the energy to the combining surface when used as an energy combiner.

Still another object of this invention is to provide an interleaving structure that uses substantially all its energy conduits to pass energy to the duplicating surface when used as a duplicator.

A further object of this invention is to provide an interleaving structure that is easily connected to other energy processing devices.

A still further object of this invention is to provide an interleaving structure where energy losses within the structure are minimal.

Another object of this invention is to provide an interleaving structure that is easily and inexpensively made.

The above and further objects of this invention will appear more fully from the following detailed descriptions when read in conjunction with the accompanying drawings.

BRIEF DESCRIPTION OF THE DRAWINGS

In the drawings where identical parts are designated by the same references:

FIG. 10A is an illustration of a set-reset flip-flop formed of interleaving structures.

FIG. 10B is a schematic logic block diagram of a set-reset flip-flop equivalent to the structure of FIG. 10A.

FIG. 11 is a partially schematic side view of an image duplicator formed of interleaving structures.

FIG. 12 is a partially schematic perspective illustration of a randon access memory cell formed of interleaving structures.

DESCRIPTION OF THE PREFERRED EMBODIMENT

Figure 1:
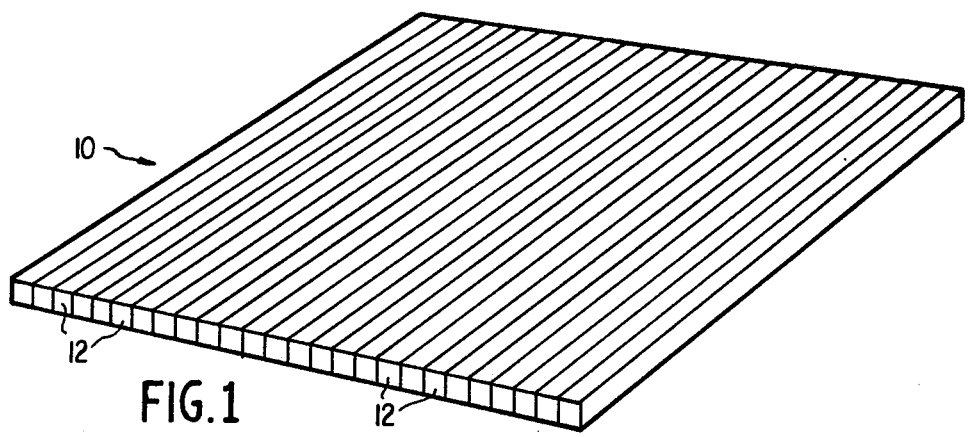
FIG. 1 is a perspective illustration of a fiber optic ribbon comprised of square optical fibers.

Referring to FIG. 1, a fiber optic ribbon, generally designated by numeral 10, is illustrated as being formed of a plurality of individual fiber optic elements or conduits 12 in juxtaposition and coupled together in the conventional manner such as, for example, by using an adhesive material known to those skilled in the art. Although conduits 10 may be in any cross-sectional configuration it is preferably a square to facilitate stacking of a plurality of optic ribbons 10.

Figure 2:
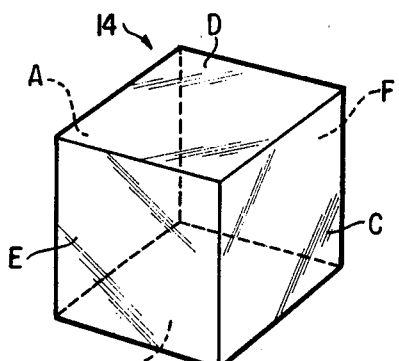
FIG. 2 is a perspective illustration of a cubic interleaving structure.
Figure 3A:
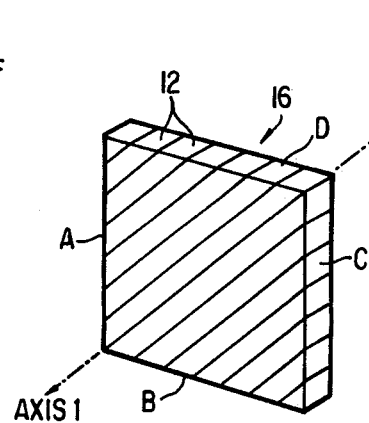
FIGS. 3A and 3B are perspective illustrations of first and second layer slices of the interleaving structure of FIG. 2.
Figure 3B:
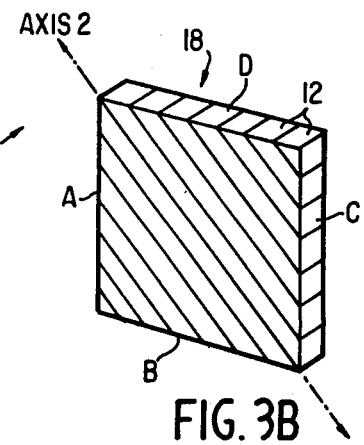

Referring to FIG. 2, a plurality of optical ribbons 10 are stacked on top of each other to form an interleaving device 14 whose faces form parallelograms. In the preferred configuration, of FIG. 2, interleaving device 14 has square faces so as to form a cube having faces designated A to F. FIGS. 3A and 3B illustrate the manner of stacking optical fibers 10 to form interleaving device 14. Specifically, FIG. 3A illustrates a top view of a first layer 16 of fiber optic ribbon 10 which is used in interleaving device 14 and is illustrated in a plane parallel to top surface E. Layer 16 is formed so that the longitudinal axis of conduits 12 are arranged in parallel along axis 1 which lies along a diagonal of layer 16. Axis 1 lies along the diagonal which joins the corner where surfaces A and B intersect with the corner where the surfaces C and D intersect. If the entire interleaver 14 were formed of layers 16, then an image projected onto surface A would be visible at surface D, and vice versa. Similarly, an image projected on surface B would be visible at surface C, and vice versa. Consequently, layers 16 are spaced apart from one another and an alternate second layer 18 as illustrated in FIG. 3B is located between adjacent layers 16. Layers 18 are formed so that the longitudinal axes of conduits 12 are parallel to a second axis 2 which is parallel to the diagonal which joins the corner formed by surfaces A and D with the corner formed by surfaces B and C. Accordingly, axis 2 is substantially perpendicular to axis 1 and similarly the longitudinal axes of conduits 12 in layers 18 are substantially perpendicular to the longitudinal axes of conduits 12 in layers 16. If the entire interleaver 14 were formed of conduits 12 arranged as illustrated in FIG. 3B, then an image projected onto surface A, would appear at surface B, and vice versa, and similarly an image projected onto surface D would be visible at surface C and vice versa.

As stated, the complete interleaver structure 14 is formed of a first and second plurality of layers of the type illustrated at 16 and 18 respectively. This interleaver layer structure creates an image processing effect which is equivalent to the combined effects of the individual layers 16 and 18. That is, in a completed interleaver 14 of the type illustrated in FIG. 2, an image projected at surface A is duplicated at surfaces B and D. Similarly an image projected at B is duplicated at A and C, an image projected at surface C is duplicated at surfaces B and D and an image projected at surface D is duplicated at surfaces C and A. Thus, it will be apparent that interleaver 14, comprising a vertical stack of alternately oriented fiber optic layers 16 and 18 can be used as an image duplicator. It will, of course, be understood that in duplicating the image, the two image facsimiles have only one-half the light intensity of the originally projected image because that image is divided into two images by the previously described fiber optic arrangement. It will also be understood that the image duplicating operation can be reversed by projected images at two surfaces, such as B and D, with the result that the two projected images will be combined at the surface A and at the surface C. In this instance, the combined image will combine the light intensities of the two originally projected images without the loss of any light from the sides.

Figure 4:
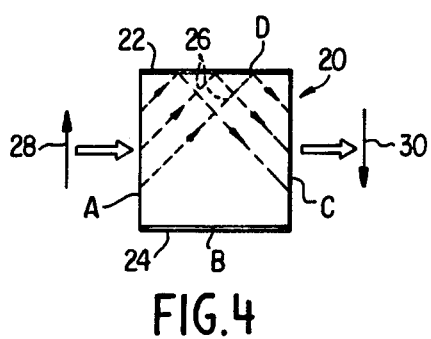
FIG. 4 is a partially schematic side view of an interleaving structure having mirrored top and bottom surfaces.
Figure 5:
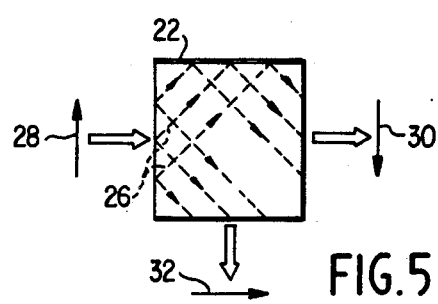
FIG. 5 is partially schematic side view of an interleaving structure having a mirrored top surface.

Referring now to FIG. 4 wherein an image inverter 20 is illustrated as including mirrored or reflective coatings 22 and 24 on opposite active surfaces of interleaver 14 for reflecting images as indicated by the dashed arrows 26. In this device, an input image, illustrated as an upright arrow 28, is projected upon an input surface A of the interleaver 14, and is projected along the lines illustrated by the dashed arrows 26 to the surface D, where it is reflected by the mirror coating 22 and is again transmitted by conduits 12 along the lines indicated by the dashed arrows 26 to emerge at the surface C in the form of an inverted image as illustrated at 30. Reflection occurs on both mirrored surfaces 22 and 24 in a complete device so that the output image has essentially all of the intensity of the input image. If one mirror surface is removed from the device as shown in FIG. 5, wherein only the mirror surface 22 is provided, two output images 30 and 32 are created, with image 30 being inverted and each at half the intensity of the input image. Thus, an additional output image 32 is illustrated in FIG. 5.

Figure 6:
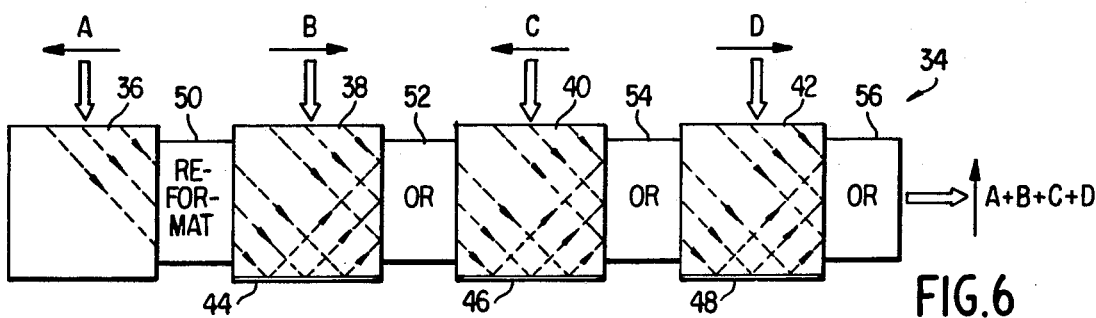
FIG. 6 is a partially schematic illustration of an OR device comprises of interleaving structures.

The device illustrated in FIG. 5 can be used to produce a cascaded logical image processing device of the type illustrated in FIG. 6. Specifically, the device illustrated is a four input OR function device 34 having individual interleavers 36, 38, 40 and 42. The first interleaver, 36, is a standard cubic interleaver block 14 as illustrated in FIG. 2, which does not have any mirrored surfaces. Interleavers 38, 40 and 42 are, on the other hand, substantially identical to the device illustrated in FIG. 5 which has one mirrored surface. Thus the devices 38, 40 and 42 each have one mirrored surface 44, 46 and 48, respectively. The cubic interleaver 36 is coupled to the cubic interleaver 38 by a REFORMATTER 50, and the cubic interleavers 38, 40 and 42 are, respectively, interconnected by OR function coupling devices 52 and 54, while an additional OR function device 56 is provided at the output of interleaver 42. The REFORMATTER 50 and the OR function devices 52, 54 and 56 are two dimensional array or image processing devices which operate upon the light transmitted by the individual conduits 12 in interleavers 36, 38, 40, and 42. The OR function devices and REFORMATTERS which perform the various image processing functions are known as "TSE" logic devices and are fully described in U.S. Pat. No. 3,996,455 entitled "Two-Dimensional Radiant Energy Array Computers and Computing Devices", the inventors being D. H. Schaefer and J. P. Strong and being assigned to the United States Government. Because these various logic devices are described in the Patent in a manner allowing one skilled in the art to make and use these devices there will be no further description of them.

In operation, inputs A, B, C and D, designated by arrows are applied to the interleavers 36, 38, 40 and 42, respectively. REFORMATTER 50 supplies additional optical gain between interleavers 36 and 38 without performing any logical function. The OR function coupling devices 52, 54 and 56 operate to provide a logical OR operation on the various inputs to provide the resultant or total OR function output. As previously described REFORMATTER 50 may be a standard "TSE" device which is used to increase the size of the light spot produced by each individual conduit 12 to a size sufficient for duplication. That is, when the output from one individual conduit 12 needs to be increased to a size equivalent to the output from two conduits 12, the "TSE" REFORMATTER provides the necessary gain, and also provides the necessary gain to overcome insertion loss caused by the light which is dissipated in conduits 12. Inputs A, B, C, and D travel through OR function device 34 as illustrated by the dashed arrows and are all outputted through OR function coupling element 56. Thus, four inputs A, B, C, and D can be logically combined together as a single output image.

Figure 7A:
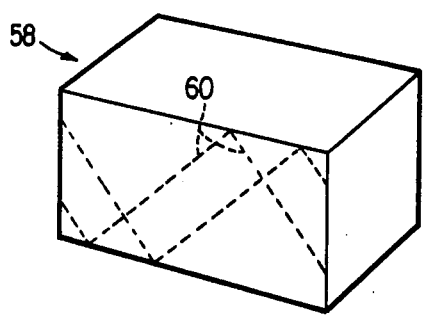
FIGS. 7A and 7B are perspective illustrations of a rectangular interleaving structure showing top and side views, respectively.
Figure 7B:
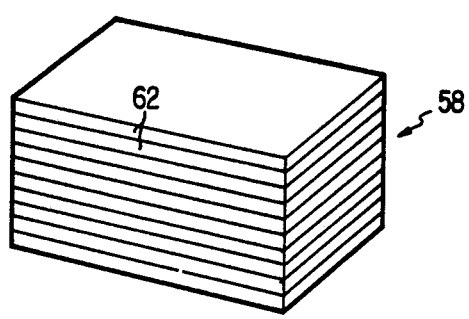
Figure 8A:
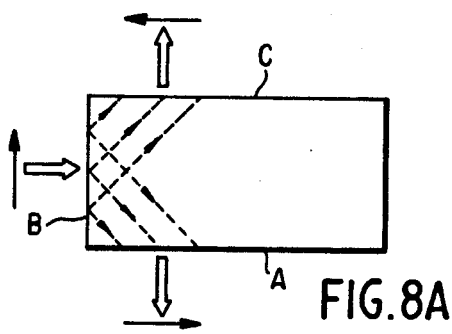
FIGS. 8A, 8B, and 8C, are side views of the rectangular interleaving structure illustrated in FIGS. 7A and 7B showing various mirrored surfaces and illustrating image input and output functions.
Figure 8B:
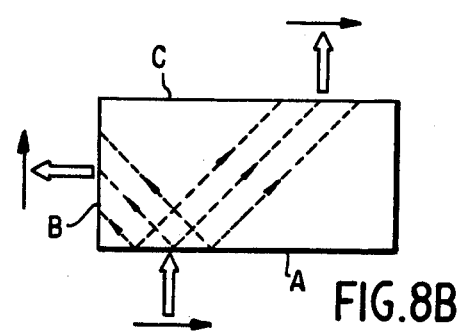
Figure 8C:
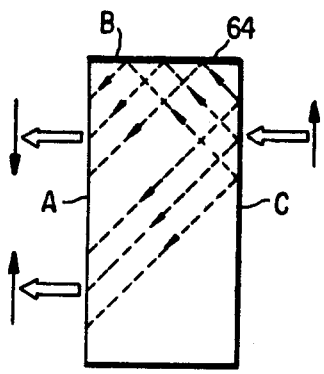

FIGS. 7A and 7B illustrate an interleaver structure, identified by the numeral 58 in which the side faces are in the shape of a rectangle and the end faces are in the shape of a square and having a length to width ratio of 2 to 1, and therefore being equivalent to two combined cubic interleavers 14 of the type described above. FIG. 7A shows a top view of the device illustrating the various layers 62 of conduits 12. FIGS. 8A, 8B and 8C illustrate the mode of operation of this rectangular interleaver 58. In particular, as shown in FIG. 8A, an image projected on face B will be reproduced at surfaces A and C, as with a cubic interleaver. Similarly, as shown in FIG. 8B, and image projected at one end of surface A will be reproduced at surface B and at the opposite end of the device on surface C. Similarly, as shown in FIG. 8C, if a mirror surface 64 is added on the face B, as in the previously described embodiment illustrated in FIGS. 4 and 5, an image projected on the upper end of the surface C will be doubly reproduced at the surface A, inverted at the upper portion of the surface but with the same orientation as the originally projected image at the lower portion of the surface.

Figure 9:
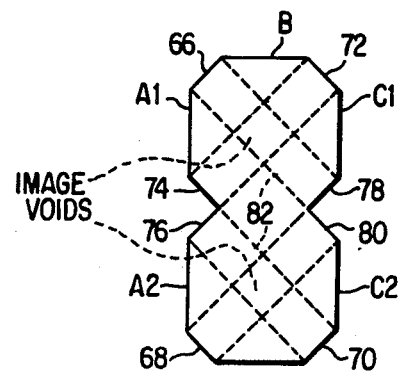
FIG. 9 is an illustration of a modified rectangular image interleaving structure having bevelled corner surfaces.

One consideration in manufacturing rectangular interleaver 58, especially as illustrated in FIG. 8C, is the lack of spacing produced between the two duplicated images appearing on surface A. Proper connection of interleaver 58 to a logic device as described in the above referenced patent, may require space for the coupling of the logic devices to interleaver 58. A modified rectangular interleaver as shown in FIG. 9, alleviates this problem. The apparatus illustrated in FIG. 9 has its four corners bevelled as illustrated at 66–72. Furthermore, four additional bevelled surfaces 74–80 are provided for separating the surface A into two subsurfaces A1 and A2 and for separating the surface C into two surfaces C1 and C2. The two bevelled surfaces 74 and 76 form a V-shaped groove separating the surfaces A1 and A2, while the bevelled surfaces 78 and 80 form a similar V-shaped groove separating the surfaces C1 and C2. The bevelled areas do not receive input images and thus create image voids as illustrated by the dashed lines 82. Thus, the illustrated apparatus provides a suitable degree of image separation.

FIG. 10A illustrates a logical set-reset flip-flop formed of optical interleavers which is equivalent to the logic diagram illustrated in FIG. 10B. The logic block diagram includes an OR gate 84 and an AND gate 85. The OR gate 84 includes a set input terminal 88 and a conventional Q output terminal 90. The AND gate 86 has one of its two inputs coupled to the Q output 90 of the OR gate 84, and has the other input coupled to a reset input terminal 92. The output of the AND gate 86 is coupled to one of the two inputs of the OR gate to complete the circuit.

The equivalent circuit formed from interleavers includes four cubic interleavers 94, 96, 98 and 100 arranged in a closed loop. Interleaver 94 is coupled to interleaver 96 through OR function device 102. Interleaver 96 is coupled to interleaver 98 through an AND function device 104. Interleaver 98 is coupled through REFORMATTER 106 to interleaver 100, which is is turn coupled through a second REFORMATTER 108 to interleaver 94 to form the closed loop. In operation, the optical circuit of FIG. 10A requires a true input at input surface 109 to hold or store each picture element. An element is "set" or stored by supplying a true pulse or level to the set input at input surface 110. The circuit remains set until the corresponding picture element applied to the reset input surface 109 becomes false or low, at which time the circuit memory is cleared. The optical set-reset flip-flop provides four image outputs 112–118 from external surfaces of the individual interleavers 94, 96 98, and 100 orientated in different directions. If the illustrated flip-flop circuit is used as a portion of a larger register, each of these individuals outputs can be used to conduct four different operations on the stored information, each operation being carried out by equipment radiating away from the illustrated circuit in a different direction.

The OR function device, AND function device, and REFORMATTERS used to interconnect the interleavers in the set-reset flip-flop and to interconnect the various interleavers and logic devices to be later described are fully desclosed in the afore-identified patent and therefore will not be described further.

Referring now to FIG. 11, an image duplicator 120 is illustrated which is similar to OR function device 34 illustrated in FIG. 6 with the exception that it includes only REFORMATTORS coupling the various cubic interleavers. Specifically, the image duplicator 120 includes four interleavers 122, 124, 126 and 128, the first three of which include mirrored top surfaces 130, 132, and 134, respectively. The cubic interleavers are joined by REFORMATTORS 136, 138 and 140. In operation, an image applied to an input surface A of duplicator 122 is reproduced at output surfaces B1, B2, B3 and B4 of 122, 124, 126, and 128, respectively. The output images are inverted at alternate output surfaces.

By combining linear OR function device 34 of FIG. 6 and linear duplicator device 120 of FIG. 11 with the reset flip-flop structure of FIG. 10A, a random access memory 142 with compact geometry may be constructed as shown in FIG. 12. Random access memory 142, includes a linear duplicator 144 formed of a plurality of cubic interleavers 146, each joined by REFORMATTERS 148. Image duplicator 144 includes an input surface A and output surfaces B1 through B4. Similarly, linear OR function device 150 is positioned adjacent linear duplicator 144 and includes four cubic interleavers 152, the first two of which are joined to the others by REFORMATTER 156. A reset flip-flop 158 is provided for each of the four stages of the devices 144 and 150. Each of the flip-flops 158 (three of which are not shown) is arranged so that the set input is positioned over device 144 and the Q output is positioned over device 150. REFORMATTERS 162 join various flip-flops 158 with devices 144 and 150. It is noted that linear OR function device 150 has input surfaces C1 through C4 and an output surface D from which memory information is retrieved. In operation, input information is supplied to input surface A of linear duplicator 144 from which outputs emerge in the vertical direction through surfaces B1 through B4, each being coupled into one of the set-reset flip-flops 158 through a REFORMATTER 162. When power is applied to one of the REFORMATTERS, flip-flop 158 receives the image present at input surface A. Linear OR function device 150 has its input connected to an output of each of the flip-flop 158 through a REFORMATTER 162, so that information enters linear OR function device 150 through input surfaces C1 through C4. When power is applied to one of these connecting REFORMATTERS 162, the image in the appropriate flip-flop 158 appears at output surface D of linear OR function device 150.

By adding a row of cubic interleavers and AND function devices between the row of flip-flops 158 and linear duplicator 144 and linear OR function devices 150 in the device illustrated in FIG. 12, instruction images can mask individual picture elements of images entering and leaving each flip-flop 158. Such a device is illustrated in FIG. 13.

Figure 13:
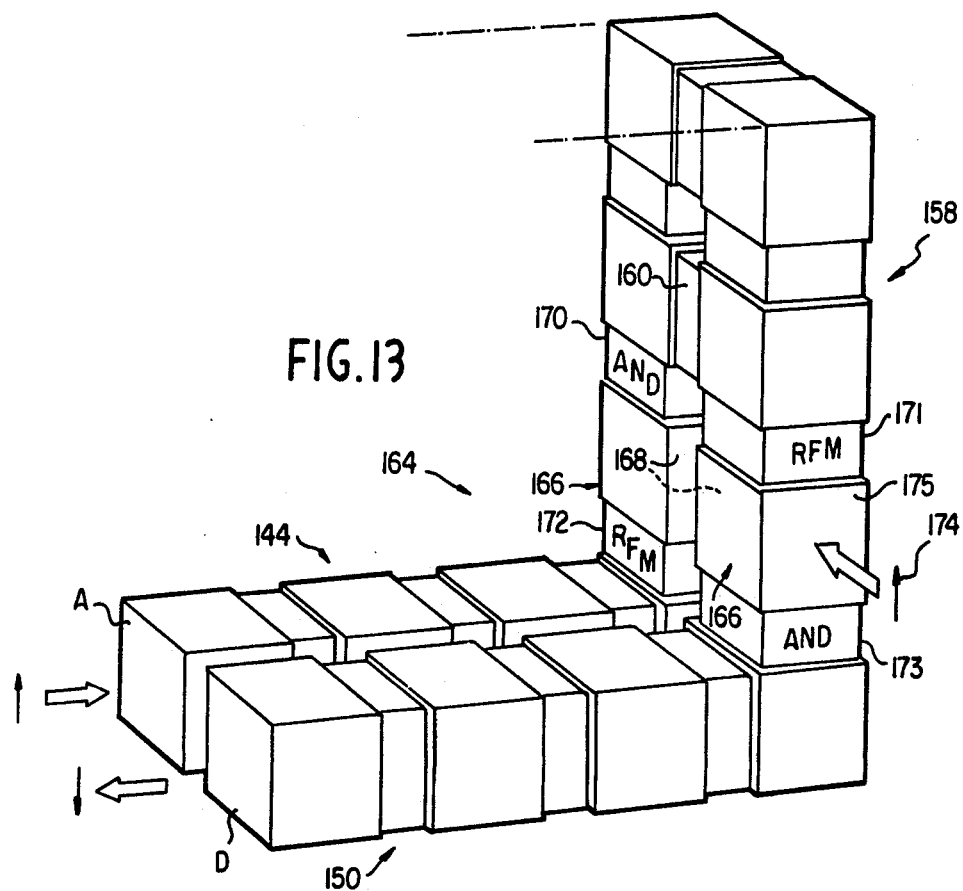
FIG. 13 is a partially schematic perspective illustration of a modified random access memory cell.

Referring particularly to FIG. 13, the above-described image masking memory is referenced generally by the numeral 164. This device is similar to random access memory 142 illustrated in FIG. 12 in that it includes a linear duplicator 144 positioned adjacent a linear OR function device 150 and includes a flip-flop 158 for each stage of devices 144 and 150. However, an additional row of cubic interleavers 166 is positioned between flip-flops 158 and devices 144 and 150 to provide a coupling apparatus. Devices 166 includes mirrored sufaces 168 on the interior facing thereof, and are coupled to flip-flop 158 by means of an AND function device 170 and a REFORMATTER 171, and are similarly coupled to devices 144 and 150 by REFORMATTER 172 and AND function device 173, respectively. Input or instructional images are applied to the new row of cubic interleavers by introducing image 174 onto surface 175. It will, of course, be understood that devices of the type illustrated may be grouped together to form large conglomerate memory units.

Figure 14:
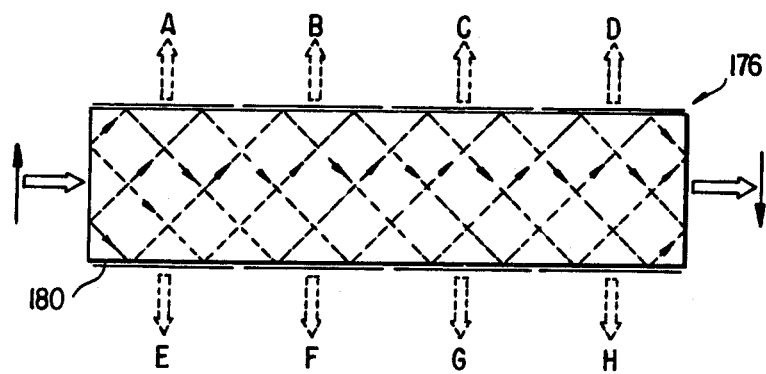
FIG. 14 is a side view of a solid optical image duplicator.

A multiple image 176 constructed in a manner similar to rectangular interleaver 58 illustrated in FIGS. 7A, 7B and 8A, B and C is illustrated in FIG. 14. Image duplicator 176 differs from that of FIG. 11 in that it is formed of a single continuous block of interleaver material and does not include the REFORMATTERS used in the FIG. 11 device. Image duplicator 176 therefore does not include the propagation delays of duplicator 120 shown in FIG. 11, and in effect, provides a method of propagating an image along a buss at the speed of light in selected optical material while allowing small quantities of the transmitted light to escape at ports along the buss. Image duplicator 176, has a length to width ratio of four, and is thus twice as long as the device of FIGS. 7 and 8. Naturally, image duplicator 176 may be further extended to any length as long as transmission losses are not so severe that the transmitted image disappears. Mirrored surfaces 178 and 180 are provided on opposite sides of device 176 so that transmitted images are reflected along image duplicator 176 from the interior sides of mirrored surfaces 178 and 180, whereby transmission along image duplicator 176 is achieved. Mirrored surfaces 178 and 180 may be removed entirely or made only partially reflective along the length of image duplicator 176 so that the transmitted image can be taken out from image duplicator 176 along its length to be supplied to other image processing equipment.

Figure 15:
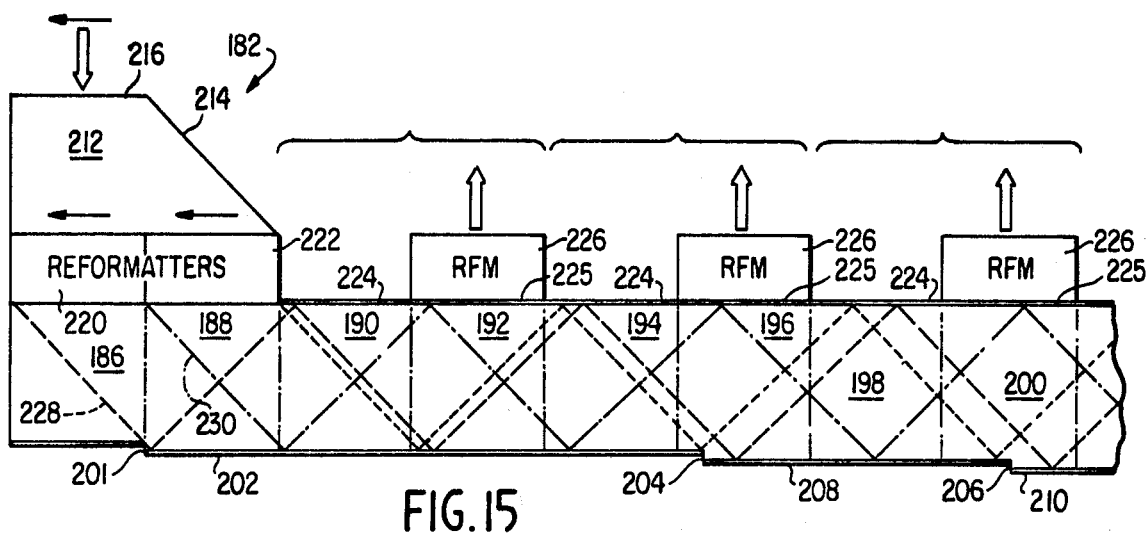
FIG. 15 is a partially schematic side view of an optical slider.

Image duplicator 176 may be modified to produce an apparatus which is equivalent to an electronic shift register. This device, which is characterized as a slider, is illustrated in FIG. 15, and is designated generally by the reference numeral 182. Slider 182 includes a central body 184 which is preferably formed of a single continuous piece of material. The material is the same as that from which cubic interleavers and duplicators, such as that shown in FIG. 14, are formed. However, slider 182 is somewhat more complex inform then previously described devices, since its dimensions vary along its length. To describe these variations, the central body of slider 182 has been divided into length units 186-200, each of which has the length of a cubic interleaver. The first length unit 186 has the dimensions of a cubic interleaver. Second length 188 is identical in length to unit 186, but is slightly longer from top to bottom than the conventional cubic interleaver. Specifically, length unit 188 has one additional step of optical fiber layer 201 (i.e. the minimum incremental unit of length in the context of the present invention). Similarly, length units 190, 192 and 194 are identical in size with the length unit 188. Furthermore, length units 188-194 have a mirrored bottom surface 202. Sixth length unit 196 includes a downward step 204 at which the height of central body 184 is again increased. Specifically, step 204 includes another unit increase in the height of central body 184. A second step 206 in the height of central body 184 is increased by two additional fiber optic layers or minimal integral units. The progression of increased thickness could, of course, be continued, it being understood that the thickness progression is binary. It is also noted that a mirrored surface 208 is provided on length units 196 and 198 and a mirrored surface 210 is provided on length unit 200.

On the top surface of slider 182 an input interleaver 212 is provided which acts as an input image duplicator. The structure of this device is not cubic, but includes one sloped surface 214 in the fashion of the prior art device previously described. An input image applied to an input surface 216 is duplicated at the bottom or output surface 218 of image duplicator 212 as designated by the letters A and A' and their associated arrow images. Images A and A' are coupled through REFORMATTERS 220 and 222 to length units 186 and 188, respectively. Along the remaining top surface of slider 182 are alternately positioned totally reflective mirrored surfaces 224 and REFORMATTERS 226 are positioned over partially reflective mirrored surfaces 225, the latter providing selectively energizable outputs labelled C, D, and E.

In operation, the gradually increased thickness of central body 184 provided by steps 201, 204, and 206 of slider 182 results in a longer travel path between reflections for each image. This in turn results in a "phase shifting" or sliding of the image toward the right in FIG. 15. To illustrate this effect, the left edge of image A is traced by a dashed line 228 and the left edge of image A' is traced by dotted line 230. As can be seen, images A and A' gradually become more and more out of phase with respect to individual length units 186-200 as they are reflected along slider 182. However, since the images A and A' are completely identical (having been produced by an image duplicator) observation of any of the output ports C, D and E reveals complementary portions of images A and A' which appear to the viewer at the output as simply a single image identical to the input image but displaced in position toward the right side of the apparatus illustrated in FIG. 15. Accordingly, a "sliding" effect is produced which is similar to the shifting of information in an electronic shift register. The image sliding occurs in a continuous manner, so that the sliding information is available at all outputs. Thus the illustrated device is essentially equivalent to a recirculating shift register.

Another way of explaining the operation of slider 182 is to visualize identical images A and A' traveling down slider 182 in an edge-to-edge fashion, one edge of each image being traced by the lines 228 and 230. If the slider 182 had no steps, i.e., if all of length units 186-200 were perfect cubic interleavers, then image A' would be available at the output ports C, D and E. However, because steps 201 204 and 206 lengthen the distance that each image must travel, each appearance of image A' is moved (slid) further to the right while adjoining image A fills in the void caused by the sliding of image A'. It will be apparent that the heights of steps 201, 204 and 206 can be chosen to provide successive sliding increments at the output ports of 1, 2, 4, 8 . . . picture elements (that is, a binary progression), as shown in the Figure. Similarly, if step 201 is the only step the sliding effect is a linear one, that is 1, 2, 3, 4 . . . picture elements. It will also be apparent that slider 182 can be extended to substantially any length by the same techniques as disclosed and illustrated.

Figure 16:
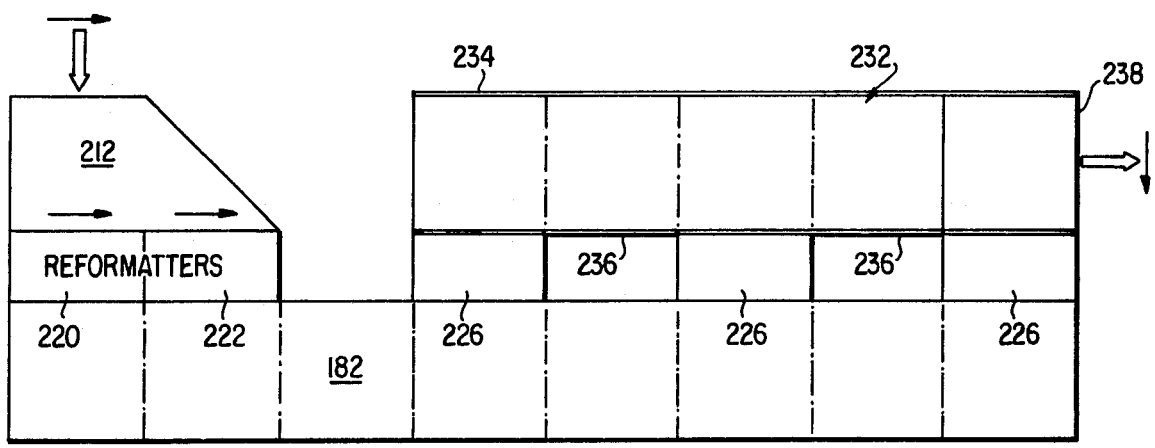
FIG. 16 is a partially schematic side view of an image combiner coupled to an optical slider of the type illustrated in FIG. 15.

Slider 182 of FIG. 15 may be coupled to a modified duplicator for providing combined output information, as shown in FIG. 16 wherein the combiner is generally indicated by the reference numeral 232. Combiner 232 is structured essentially the same as duplicator 174 (see FIG. 14) operating in reverse, with the exception that it includes a mirrored top surface 234 and mirrored bottom surface elements 236 which are positioned between REFORMATTERS 226 which themselves are mounted on mirrored surfaces thereby coupling combiner 232 with slider 182. Combiner 232 receives as inputs the outputs through an output surface 238. By selective energization of individual REFORMATTERS 226, the output of a particular stage or length unit 192, and 200 (of FIG. 15) can be selected for projection through output surface 238 of combiner 232.

It is to be noted that the operation of slider 182 of FIG. 15 and combiner 232 of FIG. 16 are governed by control of power lines to the various REFORMATTERS since images are only transmitted provided the individual REFORMATTERS are energized. Thus a non-cyclically sliding image can be produced by de-energizing one of the REFORMATTERS which projects either image A or image A' (FIG. 15) so that only one image propagates along slider 182.

Figure 17:
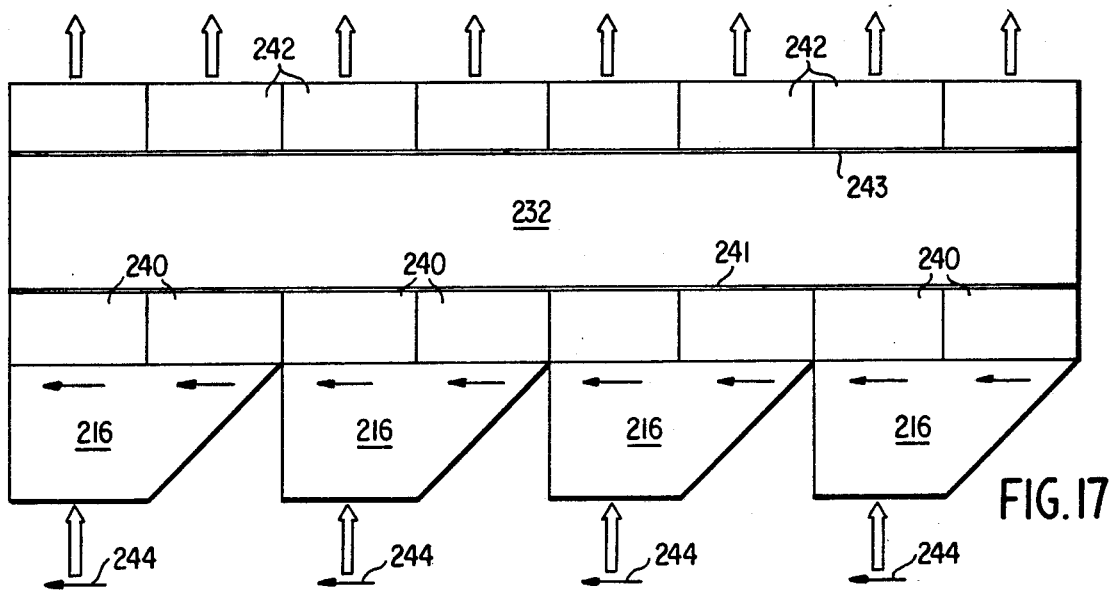
FIG. 17 is a partially schematic side view of an optical channel transfer device.
Figure 18:
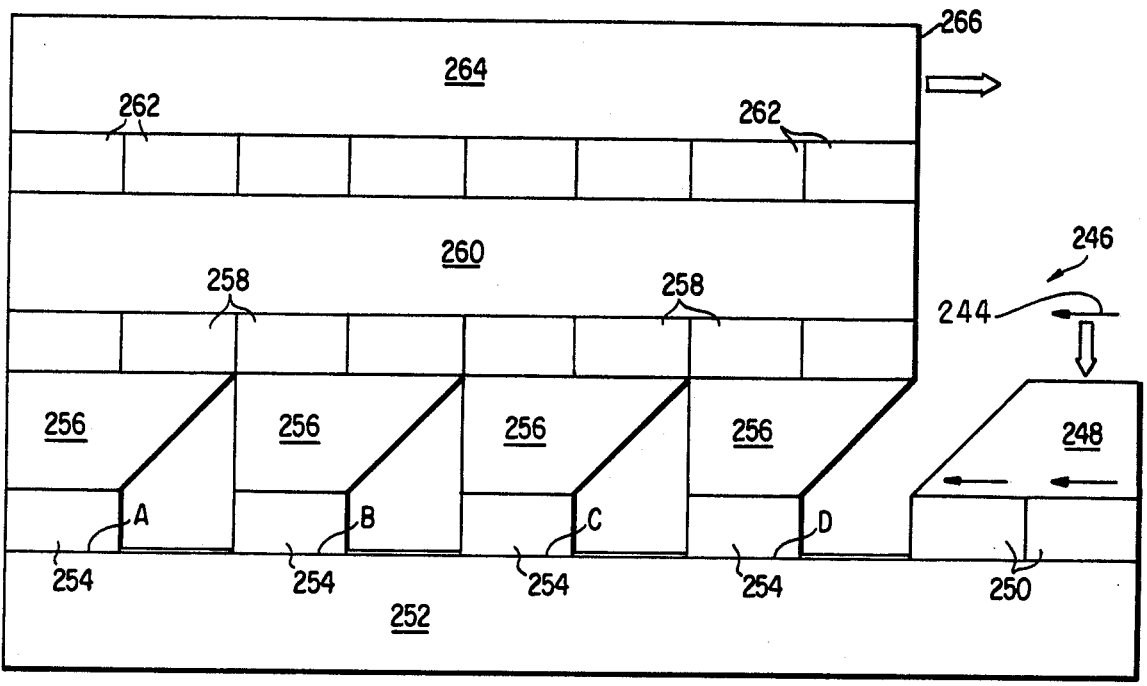
FIG. 18 is a partially schematic side view of a two-stage slider together with an output device.

FIG. 17 illustrates a combiner structure used as an all channel image distributor. Specifically, a combiner structure 232 is equipped with input REFORMATTERS 240 having partially reflective surfaces 241 along a lower surface thereof and output REFORMATTERS 242 along an upper surface thereof having partially reflective surfaces 243. A plurality of input image duplicators 216 are secured to input REFORMATTERS 240 and input images 244 may be applied thereto. If input images 244 are applied to all of input devices 216 and all REFORMATTERS 240 and 242 are energized, all input images 244 will appear at all of the output channels. However, by selective energization of the input and output REFORMATTERS, an input image 244 can be made to appear at any one of the selected output channels. A combination of the devices described above and illustrated in FIGS. 15-17 is shown in FIG. 18 and may be characterized as a fast slider, referenced generally by the numeral 246. Fast slider 246 may provide any integral number of slides from 1 to the largest coordinate of a matrix which can be formed by combining the devices of FIGS. 15-17. Fast slider 246 has a minimum of three REFORMATTER delay periods. In fast slider 246 an input image 244 is applied to an input image duplicator 248, passed through input REFORMATTERS 250 and propagated down a linear slider 252 for producing output images A-D which are respectively slid 4, 3, 2 and 1 units respectively. Output REFORMATTERS 254 couple these output images through image duplicators 256 to input REFORMATTERS 258 of a combiner 260. Combiner 260 is equipped with a row of output REFORMATTERS 262 which permit selective coupling to a second combiner 264 having an output surface 266 from which any selected image can be outputted.

The output images A-D may be further slid by combiner 260. That is, combiner 260 illustrated in FIG. 18 is a second slider 182 of the type shown in FIG. 15 to further slide the images by units of 4, 8, 12 and 16. In the processing of image B, for example, this image is slid by three units in slider 252, then projected into a second combiner 260 where it may be slid by 4, 8, 12 or 16 units and be outputted through one of the output REFORMATTERS 262 to combiner 264.

Figure 19:
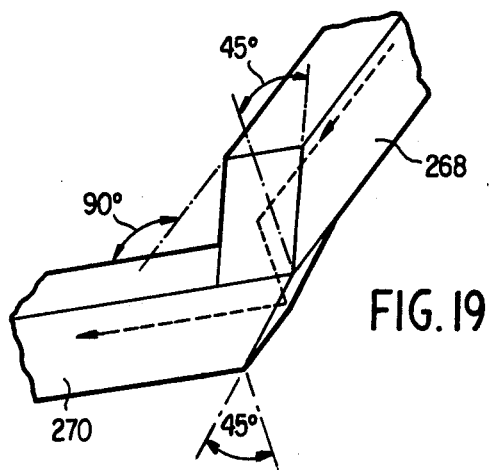
FIG. 19 is a perspective illustration showing the coupling between two square optical fibers.
Figure 20:
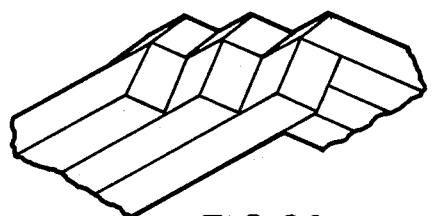
FIG. 20 is a perspective illustration of a plurality of optical fibers coupled together.

FIGS. 19 and 20 illustrate the production of interleavers, the basic elements in the previously described structures. FIG. 19 illustrates a simple method of making a 90° corner between two rectangular conduits 268 and 270. First, 45° angles are cut on the ends of conduits 268 and 270 and the surfaces of those cuts are finished to produce total internal reflection, either by polishing or metalizing. The appropriate conduits are then coupled together by conventional techniques to produce a geometry of the type illustrated in FIG. 20. This technique requires very precise cutting of conduits 268 and 270 which are preferably optical fibers.

As an alternative to the above-described method, a block of appropriate conduit material such as fiber optic material, may be machined to produce the required 45° angled end surfaces for producing total internal reflection. Smoothing of a cut surface may be achieved by passing a high temperature torch over the cut area to melt the surface quickly and to permit it to flow slightly and then reharden into a smooth surface. Again, however, these steps require considerable precision.

Another approach for providing reflection at the ends of the conduits is to use prisms positioned at the ends of the conduits. Prisms may be produced in the manner of defraction gratings, where a ruling machine cuts linear prisms in metal, and these are reproduced in epoxy (or an equivalent suitable material) with an index of refraction of plastic optical fibers, i.e., polystyrene cores. A number of conventional techniques are possible for producing the prims and attaching them to the interleaver materials for producing the required reflection.

The above-preferred description sets forth the invention as it relates to the preferred fiber optic image processing. It should be understood, however, that the various structures and devices are not limited to fiber optics but may be used with and constructed from other signal transporting mediums. For example, the interleaver, rather than being constructed of optical fibers, may be constructed of layers of parallel electrical conducting wires for the processing of electrical signals. Consequently, the various OR and AND devices, REFORMATTERS, duplicators, combiners, and sliders used in conjunction with the interleavers would all be devices responsive to electrical signals. Further, the interleaver may be constructed of layers of parallel radiant energy waveguids, such as for the processing of microwave energy signals.

Obviously, numerous additional modifications and variations of the present invention are possible in light of the present teachings. It is therefore to be understood that within the scope of the appended claims, the invention may be practiced otherwise than as specifically described herein.

Accordingly, the invention having been described in its best embodiment and mode of operation, that which is desired to be claimed by Letters Patent is:

1. An interleaving device, comprising:
    a first plurality of spaced energy carrying layer means having a plurality of juxtaposed conduit means for passing energy signals therethrough, each of said conduit means having a longitudinal axis substantially parallel to a diagonal of each of said first plurality of layers means; and
    a second plurality of energy carrying layer means arranged between adjacent ones of said first plurality of layer means and having a plurality of juxtaposed conduit means for passing said energy signals therethrough, each of said conduit means of said second plurality of layer means having a longitudinal axis substantially parallel to a diagonal of each of said second plurality of layer means and substantially perpendicular to said axis of said conduits means of said first layer means.

2. The interleaving device of claim 1 wherein said interleaving device includes a plurality of sides formed as parallelograms.

3. The interleaving device of claim 2 wherein said conduit means of said first plurality of layer means and said second plurality of layer means include optical fibers and energy signals include optical images.

4. The interleaving device of claim 3 wherein said optical fibers are square in cross-sectional configuration.

5. The interleaving device of claim 4 further comprising reflective surfaces adjacent a plurality of said sides formed as parallelograms.

6. The interleaving device of claim 4 further comprising means for totally internally reflecting said optical images between said first plurality of layer means and said second plurality of layer means.

7. The interleaving device of claim 6 wherein said reflecting means includes a reflective surface on at least one of said sides which is substantially perpendicular to the face of said first plurality of layer means and said second plurality of layer means.

8. The interleaving device of claim 6 wherein said reflecting means includes a plurality of prisms on at least one of said sides which is substantially perpendicular to the face of said first plurality of layer means and said second plurality of layer means.

9. The interleaving device of claim 4 wherein a plurality of said sides are rectangular in shape having bevelled corners for producing image voids within said optical fibers.

10. The interleaving device of claim 9 further including V-shaped groves in at least two of said rectangular sides for complementing said bevelled corners in producing image voids.

11. The interleaving device of claim 2 wherein said device is of nonuniform thickness along its length.

12. The interleaving device of claim 11 wherein said device increases in thickness along its length in incremental steps.

13. The interleaving device of claim 12 wherein said conduits of said first plurality of layer means and said second plurality of layer means include optical fibers and said energy signals include optical images.

14. The interleaving device of claim 13, further comprising:
    image duplicating means coupled to said device for supplying two identical input images thereto; and
    means for sliding said input images along interleaving devices.

15. The interleaving device of claim 2 wherein said sides are substantially square for forming a cubic structure.

16. A set-reset flip-flop device responsive to energy signals, comprising:
    a plurality of interleaving means for receiving said energy signals, each of said means comprising;
    a first plurality of spaced energy carrying layer means having a plurality of juxtaposed conduit means for passing said energy signals therethrough, each of said conduit means having a longitudinal axis substantially parallel to a diagonal of each of said first plurality of layer means, and
    a second plurality of energy carrying means arranged between adjacent ones of said first plurality of layer means and having a plurality of juxtaposed conduit means for passing said energy signals therethrough, each of said conduit means of said second plurality of layer means having a longitudinal axis substantially parallel to a diagonal of each of said second plurality of layer means and substantially perpendicular to said axis of said conduit means of said first plurality of layer means;

OR function means coupled between a first and second of said interleaving means, said first interleaving means responsive to an input energy signal;

first REFORMATTER means coupled between said first interleaving means and a third of said interleaving means;

second REFORMATTER means coupled between said third interleaving means and a fourth of said interleaving means; and AND function means coupled between said second and fourth interleaving means.

17. The set-reset flip-flop device of claim 16 wherein said interleaving means are optical interleaving means, said REFORMATTER means are optical REFORMATTER means and said OR and AND function means are optical function means.

18. An OR function device responsive to energy signals, comprising:
a plurality of interleaving means for receiving said energy signals, each of said interleaving means comprising;
a first plurality of spaced energy carrying layer means having a plurality of juxtaposed conduit means for passing said energy signals therethrough, each of said conduit means having a longitudinal axis substantially parallel to a diagonal of each of said first plurality of layer means, and
a second plurality of energy carrying means arranged between adjacent ones of said first plurality of layer means and having a plurality of juxtaposed conduit means for passing said energy signals therethrough, each of said conduit means of said second plurality of layer means having a longitudinal axis substantially parallel to a diagonal of each of said second plurality of layer means and substantially perpendicular to said axis of said conduit means of said first plurality of layer means;
REFORMATTER means coupled between a first and second of said interleaving means, said first interleaving means being responsive to an input energy signal;
OR function means coupling additional ones of said interleaving means; and
OR function means coupled between one of said additional interleaving means and said second interleaving means.

19. The OR function device of claim 18 wherein said interleaving means are optical interleaving means, said REFORMATTER means is an optical REFORMATTER means, and said OR function means are optical OR function means.

20. A duplicator device for duplicating applied energy signals, comprising:
a plurality of interleaving means for receiving energy signals, each of said interleaving means comprising;
a first plurality of spaced energy carrying layer means having a plurality of juxtaposed conduit means for passing said energy signals therethrough, each of said conduit means having a longitudinal axis substantially parallel to a diagonal of each of said first plurality of layer means, and
a second plurality of energy carrying means arranged between adjacent ones of said first plurality of layer means and having a plurality of juxtaposed conduit means for passing said energy signals therethrough, each of said conduit means of said second plurality of layer means having a longitudinal axis substantially parallel to a diagonal of each of said second plurality of layer means and substantially perpendicular to said axis of said conduit means of said first plurality of layer means; and
a plurality of REFORMATTER means coupled between each of said interleaving means.

21. The duplicator device of claim 20 wherein said interleaver means are optical interleaver means and said REFORMATTERS means are optical REFORMATTER means.

22. A random access memory device, comprising:
duplicator means for duplicating applied energy signals, said duplicator means comprising;
a plurality of interleaving means for receiving energy signals, each of said interleaving means comprising;
a first plurality of spaced energy carrying layer means having a plurality of juxtaposed conduit means for passing said energy signals therethrough each of said conduit means having a longitudinal axis substantially parallel to a diagonal of each of said first plurality of layer means, and
a second plurality of energy carrying means arranged between adjacent ones of said first plurality of layer means having a plurality of juxtaposed conduit means for passing said energy signals therethrough, each of said conduit means of said second plurality of layer means having a longitudinal axis parallel to a diagonal of each of said second plurality of layer means and substantially perpendicular to said axis of said conduit means of said first plurality of layer means; and
a plurality of REFORMATTER means coupled between each of said interleaving means;
linear OR function device for providing logical OR function processing of said energy signals; and
a plurality of set-reset flip-flop means coupled to said duplicator means and to said linear OR function device for storing information, said plurality of flip-flop means equal in number to the number of stages in said duplicating and OR function device.

23. The random access memory device of claim 22 wherein said linear OR function device includes:
a plurality of interleaving means for receiving said energy signals;
REFORMATTER means coupled between a first and second of said interleaving means, said first interleaving means being responsive to an input energy signal;
OR function means coupling additional ones of said interleaving means; and
OR function means coupled between one of said additional interleaving means and said second interleaving means.

24. The random access memory device of claim 22 wherein each of said set-reset flip-flop means includes:
a plurality of interleaving means for receiving said energy signals;

OR function means coupled between a first and second of said interleaving means, said first interleaving means responsive to an input energy signal;

first REFORMATTER means coupled between said first interleaving means and a third of said interleaving means;

second REFORMATTER means coupled between said third interleaving means and a forth of said interleaving means; and AND function means coupled between said second and fourth interleaving means.

25. The random access memory device of claim 22 wherein said duplicator means are optical image duplicator means, said linear OR function devices are optical OR function devices and said set-reset flip-flop means are optical set-reset flip-flop means.

26. The random access memory device of claim 25 further comprising a plurality of optical interleaving means for selectively coupling said set-reset flip-flop means with said optical image duplicator and linear OR function devices.

27. A fast-acting slider device responsive to applied energy signals, comprising:

a first slider stage;

duplicator means coupled to said first slider stage for supplying two duplicate input energy signals thereto, said duplicator means comprising;

a plurality of interleaving means for receiving energy signals, each of said interleaving means comprising;

a first plurality of spaced energy carrying layer means having a plurality of juxtaposed conduit means for passing said energy signals therethrough, each of said conduit means having a longitudinal axis substantially parallel to a diagonal of each of said first plurality of layer means, and a second plurality of energy carrying layer means arranged between adjacent ones of said first plurality of layer means and having a plurality of juxtaposed conduit means for passing said energy signals therethrough, each of said conduit means of said second plurality of layer means having a longitudinal axis substantially parallel to a diagonal of each of said second plurality of layer means and substantially perpendicular to said axis of said conduit means of said first plurality of layer means; and a plurality of REFORMATTER means coupled between each of said interleaving means;

a second slider stage;

coupling means for interconnecting said first and second slider stages; and signal combining means coupled to said second slider stage to provide an output signal.

28. The fast-acting slider device of claim 27 wherein said slider stages are optical slider stages, said duplicator means are optical duplicator means and said signal combining means are optical combining means.

* * * * *